United States Patent Office 2,910,446
Patented Oct. 27, 1959

2,910,446

PHYSICAL TREATMENT OF PARTICULATE FOAMABLE STYRENE POLYMER COMPOSITIONS

Murray H. Roth, Springfield, Mass., assignor to Monsanto Chemical Company, St. Louis, Mo., a corporation of Delaware No Drawing. Application September 10, 1956
Serial No. 608,676

1 Claim. (Cl. 260—2.5)

The present invention relates to the physical treatment of particulate foamable styrene polymer compositions to improve the foaming properties thereof.

Styrene polymer foams constitute a valuable class of materials which are finding increasingly wide application in the fabrication of numerous consumer and industrial articles. Such styrene polymer foams can be prepared by heating small particles of styrene polymers which have volatile organic compounds incorporated therein as foaming agents, such heating preferably being effected by either hot water or steam. The above-described method of preparing styrene polymer foams is known to suffer from two deficiencies. First, the pore sizes of the foams so obtained tend to be irregular and relatively large, e.g., the majority of the cells have diameters of greater than about 0.05 inch, whereas the most desired foams have a substantially uniform cell size with the majority of the cells having a diameter of less than about 0.02 inch. Secondly, the particulate styrene polymers which contain relatively large quantities of foaming agent, e.g., 7% or more, frequently do not foam well and yield foams having undesirably high densities.

It is an object of this invention to provide particulate foamable styrene polymer compositions which, when heated, yield foams having substantially uniform pore sizes, the majority of which have a diameter of less than about 0.02 inch.

Another object of this invention is to provide particulate foamable styrene polymer compositions containing relatively large quantities of foaming agent and which, when heated, yield foams of desired low densities.

Other objects and advantages of this invention will be apparent from the following detailed description thereof.

The above objects are obtained by subjecting particulate foamable styrene polymer compositions to a compressive force as by passing the polymer particles through a pair of rolls having a clearance that is less than the average diameter of the polymer particles.

The following examples are set forth to illustrate more clearly the principle and practice of this invention to those skilled in the art. All parts are by weight.

EXAMPLE I

Part A

A foamable styrene polymer composition containing 8 weight percent pentane is prepared by an aqueous suspension polymerization process employing as the suspending agent both a polyvinyl alcohol containing 12% unhydrolyzed acetate groups and a sodium salt of bis (sulfonaphthyl) methane. The polymer particles are obtained as clear, transparent beads having an average diameter of 1/4 inch.

Part B

Beads of foamed polystyrene are prepared by heating the foamable styrene polymer particles prepared in Part A above for 5 minutes in boiling water. The foamed polystyrene beads have large irregular cell sizes and a density of 12.5 lbs. per cubic foot.

EXAMPLE II

Part A

The foamable styrene polymer particles prepared in Example I, Part A, are subjected to a compressive force by passing the 1/4 inch diameter beads through a pair of rubber-mill rolls set at a clearance of 3/16 inch. After this treatment, the foamable styrene polymer beads contain areas of opacity indicating physical strains in the polymer beads.

Part B

Foamed styrene polymer beads are prepared by heating the treated styrene polymer beads of Part A above for five minutes in boiling water. The foamed styrene polymer beads have a uniform small cell size and a density of 6 lbs. per cubic foot. These results are to be compared with Example I, Part B, wherein the non-treated styrene polymer beads yielded foamed beads of irregular cell size and having a density of 12.5 lbs. per cubic foot.

EXAMPLE III

Part A

Foamable styrene polymer particles containing 5% pentane are prepared by an aqueous suspension polymerization process empolying the suspending agents described in Example I, Part A. The polymer particles are clear, transparent spheres having an average diameter of 1/4 inch.

Part B

The polymer particles prepared in Part A above are subjected to a compressive force by passing the beads through a pair of rubber-mill rolls set at a clearance of 3/16 inch. The treated beads have areas of opacity indicating physical strains in the polymer beads.

Part C

The foamable styrene polymer beads of Part A and Part B above are each placed in a perforate rectangular mold and placed in a steam atmosphere to prepare molded styrene polymer foams having densities of 4 lbs. per cubic foot. The foam prepared from the polymer particles of Part A has large irregular cell sizes with the majority of the cells having a diameter of greater than about 0.05 inch. In contrast with these results, the styrene polymer foam prepared from the treated polymer particles of Part B have a uniform pore size with the majority of the cells having a diameter of less than about 0.02 inch.

The foaming characteristics of particulate foamable styrene polymers are improved by subjecting the polymer particles to a compressive force. The compressive force may be imposed upon the polymer particles by any desired physical means, but advantageously is imposed by passing the particles through a pair of rolls set at a clearance less than the average diameter of the polymer particles. The force imposed upon the polymer particles should be sufficient to develop stresses within the polymer particles. The presence of such stresses is indicated by areas of opacity which develop in the otherwise clear and transparent polymer particles.

The foamable styrene polymer compositions treated by the method of this invention comprise a styrene polymer and a foaming agent which is a volatile organic compound having a boiling point below the softening point of the styrene polymer employed.

The styrene polymers included in the compositions of this invention are homopolymers of styrene and interpolymers of styrene containing a predominant proportion of styrene, i.e., greater than 50 weight percent and preferably greater than 75 weight percent styrene. Examples of monomers that may be interpolymerized with the styrene include the conjugated 1,3-dienes, e.g., butadiene, isoprene, etc., alpha beta-unsaturated monocarboxylic acids and derivatives thereof, e.g., acrylic acid, methyl acrylate, ethyl acrylate, butylacrylate, 2-ethylhexyl acrylate and the corresponding esters of methacrylic acid, acrylamide, methacrylamide, acrylonitrile, methacrylonitrile, divinyl benzene, etc. If desired, blends of the styrene polymer with other polymers may be employed, e.g., blends of the styrene polymer with rubbery diene polymers or the analogous compositions obtained by dissolving a rubbery diene polymer in the styrene monomer and subsequently polymerizing the mixture. In any of the above-type resins, all or a portion of the styrene may be replaced with its closely related homologues such as alpha methylstyrene, o-, m-, and p-methylstyrenes, o-, m-, and p-ethylstyrenes, 2,4-dimethylstyrene, etc. In general, the styrene polymers employed should have a molecular weight in the range of about 40,000–80,000 (as determined by the Staudinger method).

The foaming agent employed in the compositions of the invention may be any organic compound which boils below the softening point of the styrene polymer and which can be incorporated substantially homogeneously therethrough. Preferably, although not mandatorily, the foaming agent should have little or no solvent action on the polymer. Suitable examples of such foaming agents include acetone, methyl alcohol, methyl acetate, ethyl acetate, methyl formate, ethyl formate, dichloroethylene, isopropyl chloride, propionaldehyde and dipropyl ether. Other examples of suitable foaming agents include methyl chloride, dichloroethane, dichlorodifluoromethane and other low boiling chlorofluoroalkanes. An especially preferred class of foaming agents consists of aliphatic hydrocarbons boiling within the range of about 10° C. to about 80° C., e.g., pentane, hexane, heptane, cyclopentane, cyclopentadiene and petroleum ethers boiling within the indicated temperature range. If desired, mixtures of two or more foaming agents may be employed.

The treated particulate foamable styrene polymer compositions of this invention may be used interchangeably with non-treated particulate foamable styrene polymer compositions to provide styrene polymer foams of lower density and/or finer pore size.

The above descriptions and particularly the examples are set forth by way of illustration only. Many other variations and modifications thereof will be obvious to those skilled in the art and can be made without departing from the spirit and scope of the invention herein described.

What is claimed is:

A method for improving the foaming characteristics of particulate styrene polymers having incorporated therein, as a foaming agent, an aliphatic hydrocarbon boiling within the range of about 10–80° C. which comprises passing said styrene polymer particles through a pair of rolls having a clearance of about 75% of the average diameter of the polymer particles and recovering said styrene polymer in particulate form; said rolls being maintained at ambient temperature.

References Cited in the file of this patent

UNITED STATES PATENTS

| | | |
|---|---|---|
| 2,319,040 | Conklin | May 11, 1943 |
| 2,442,940 | Staudinger et al. | June 8, 1948 |